May 14, 1963 W. D. LUDWIG 3,089,517
COMPOUND VALVE
Filed July 17, 1958 5 Sheets-Sheet 1
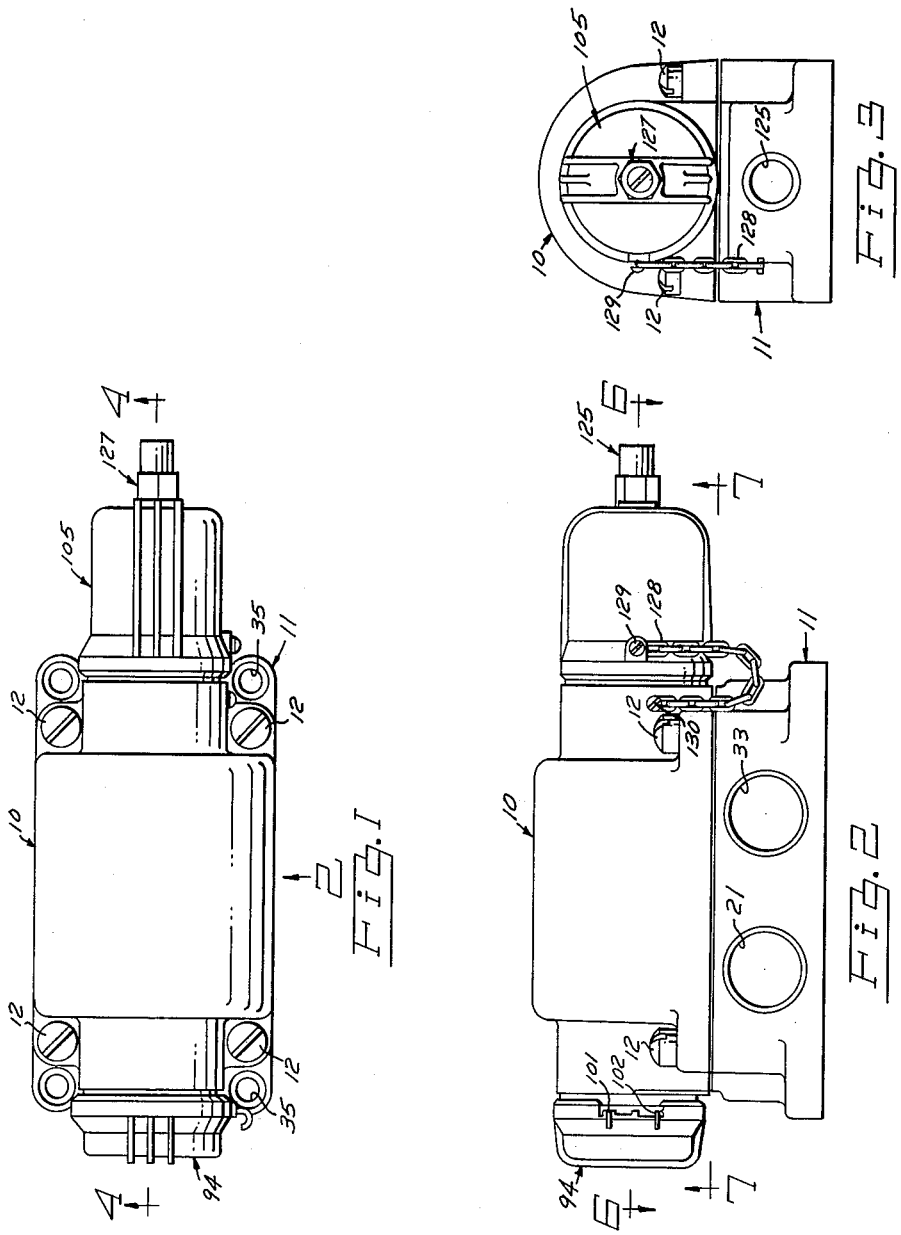
INVENTOR.
WALTER D. LUDWIG
BY
Donnelly, Mentag & Harrington
ATTORNEYS

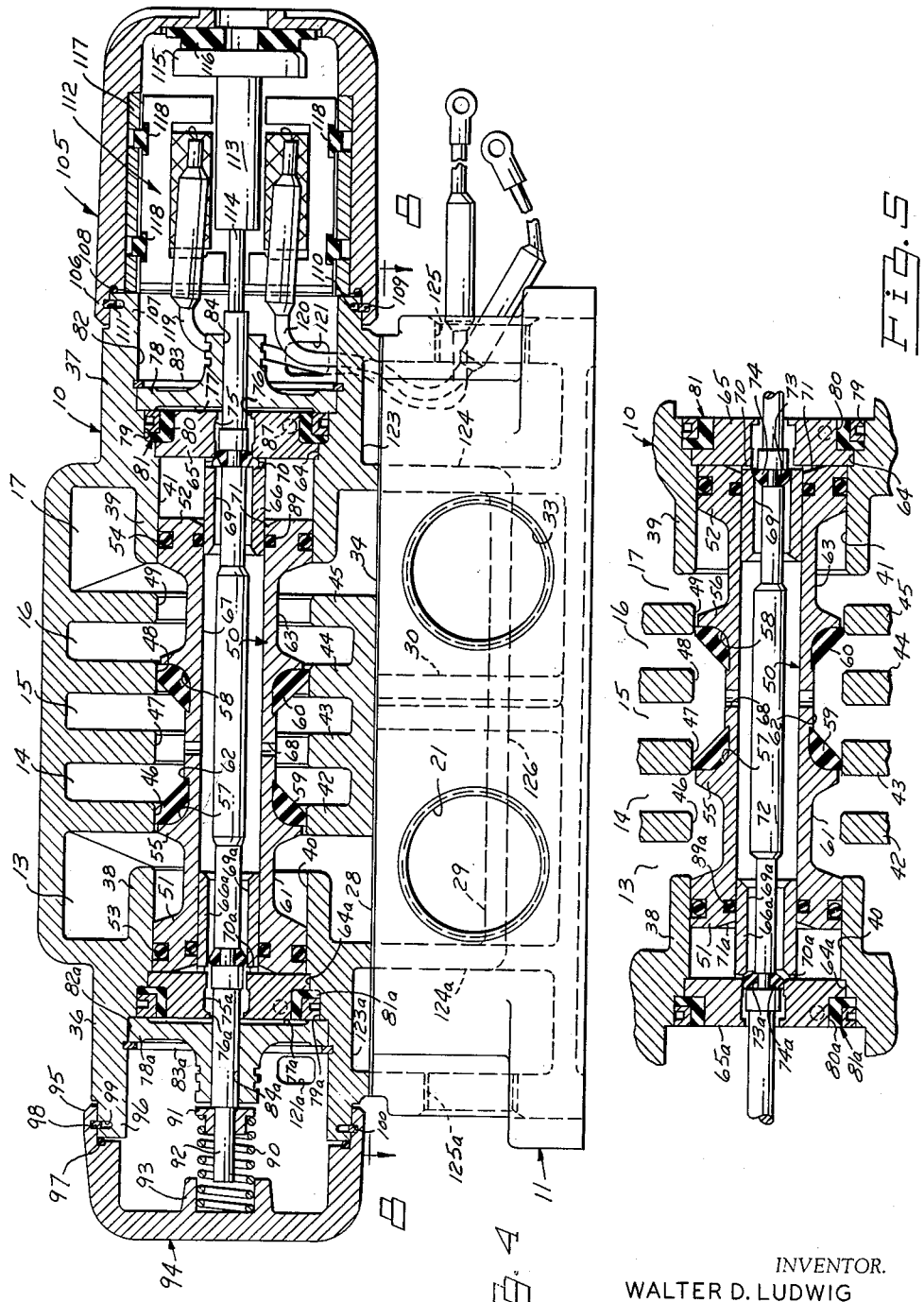

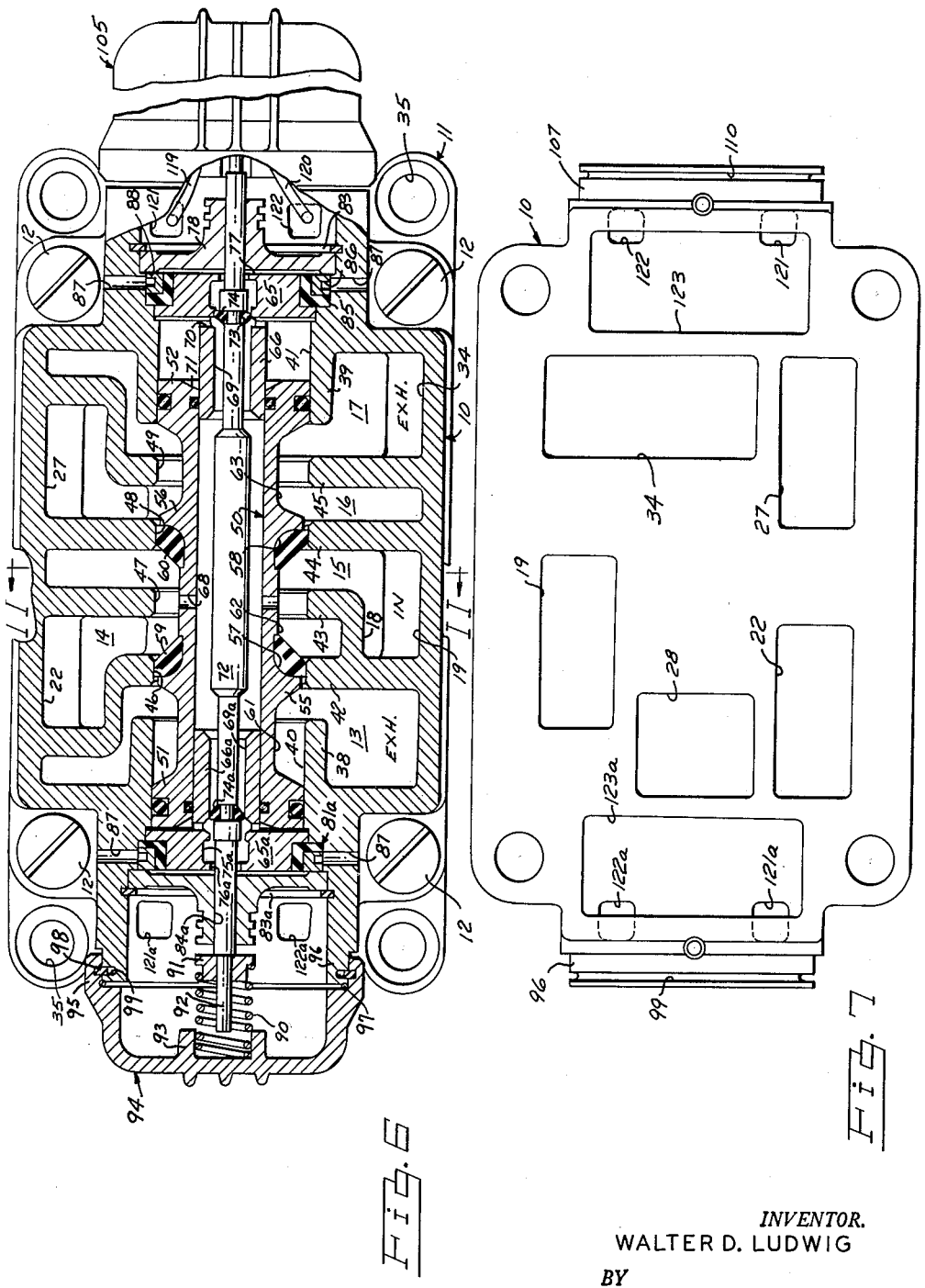

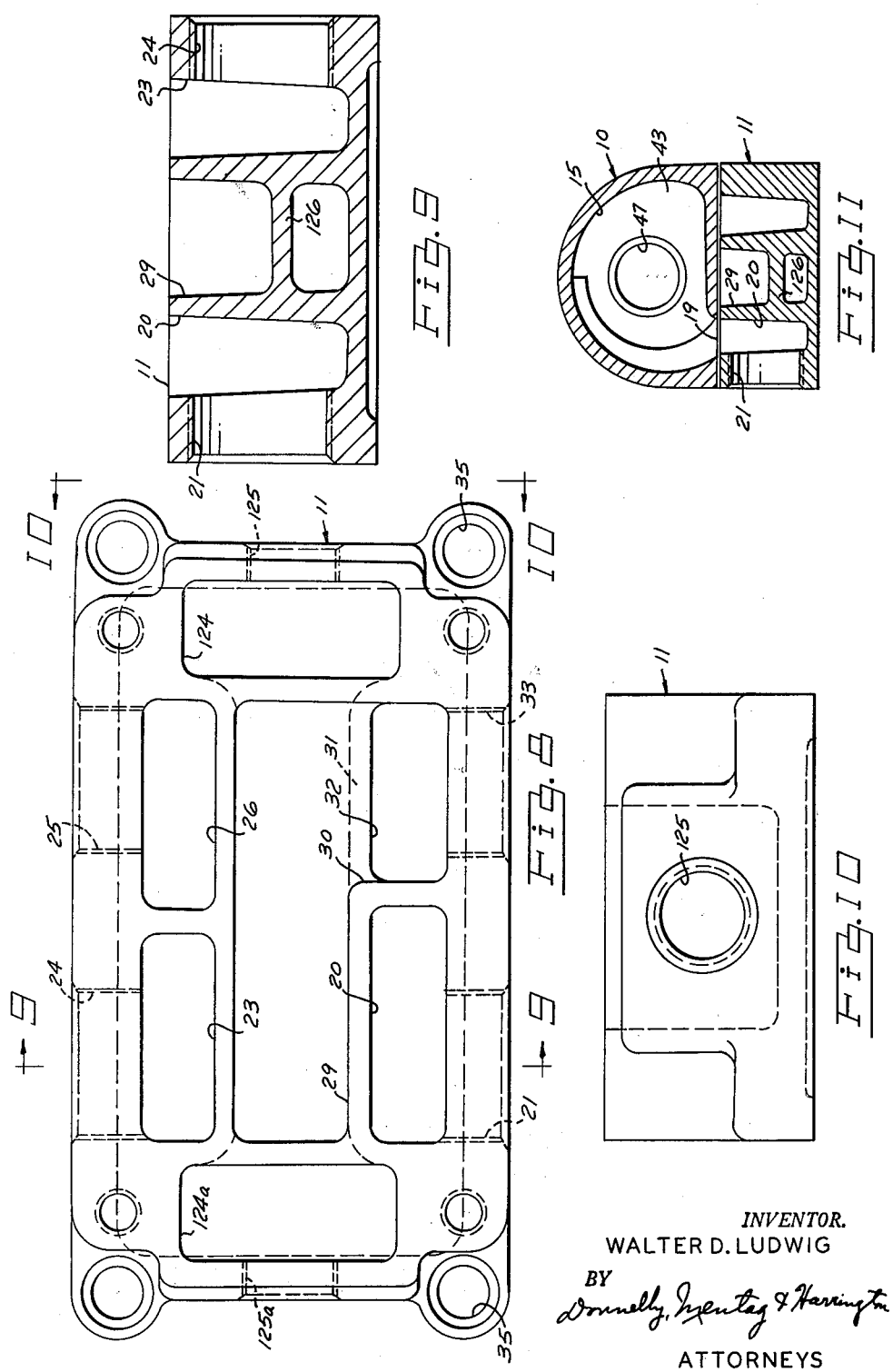

May 14, 1963 W. D. LUDWIG 3,089,517
COMPOUND VALVE
Filed July 17, 1958 5 Sheets-Sheet 5
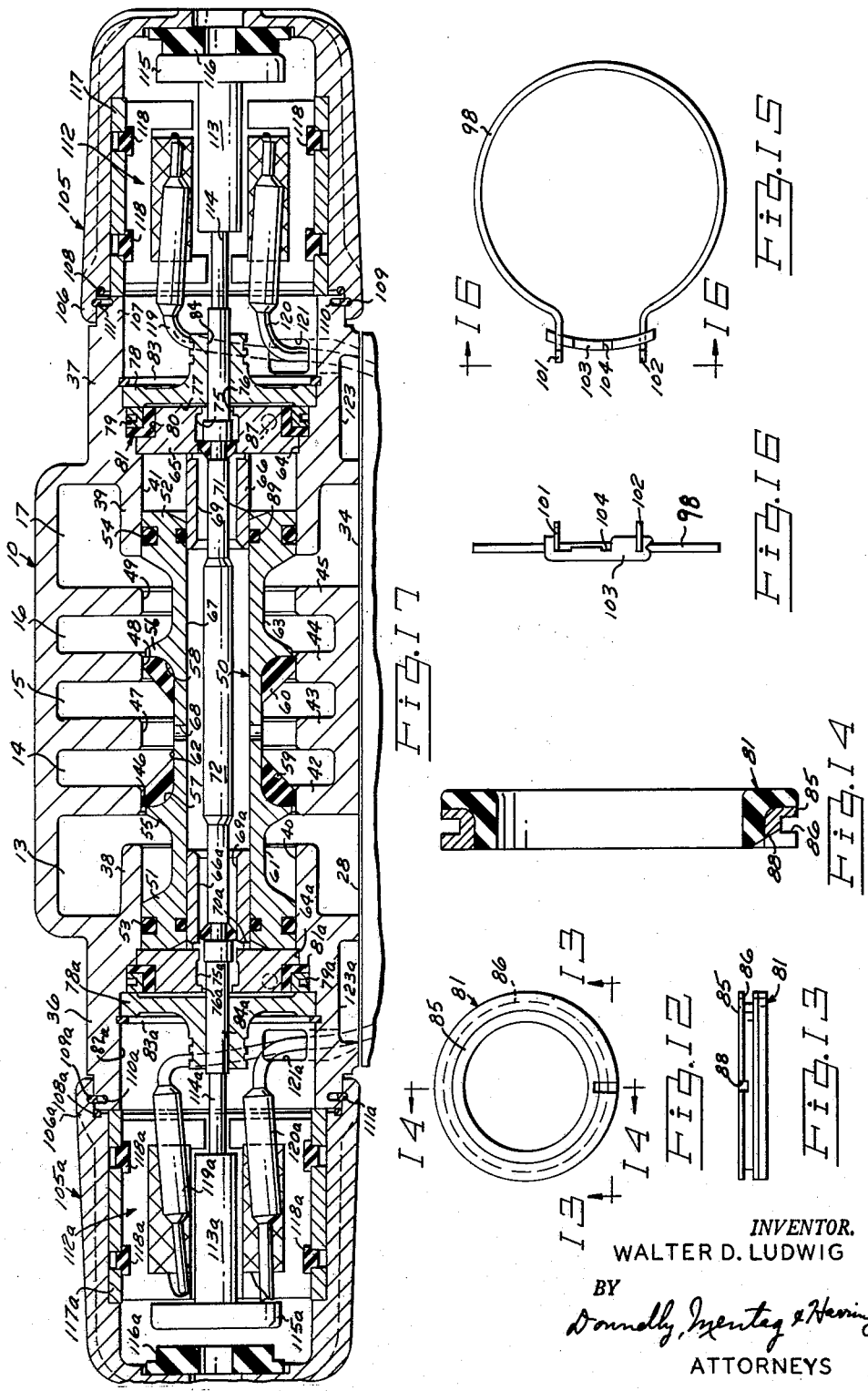
INVENTOR.
WALTER D. LUDWIG
BY
Donnelly, Menteq & Harrington
ATTORNEYS

United States Patent Office 3,089,517
Patented May 14, 1963

3,089,517
COMPOUND VALVE
Walter D. Ludwig, 3865 W. Lincoln Drive,
Birmingham, Mich.
Filed July 17, 1958, Ser. No. 749,212
16 Claims. (Cl. 137—623)

This invention relates to improvements in valves, and, more particularly, to a new and useful pilot controlled four-way reversing valve.

It is an object of the invention to provide a four-way reversing valve of the pilot controlled type which employs two pilot valves and which is particularly adapted and intended for fast operation for high speed valve cycling of pressure fluid for the operation of various types of fluid actuated machines. A common shortcoming of pilot operated valves is the relatively slow speed of operation because the pilot valves are located remotely from the master spool. It is another object of this design to provide a simple means of bringing pressure fluid to the two pilot valves and to locate the two pilot valves immediately adjacent to the point of application of fluid against the master spool, thus overcoming the delays inherent in existing valve designs.

Another shortcoming of pilot operated valves is their large size because of the addition of pilot valves to basic valve design. It is a further object of this invention to provide a compound design employing dual-spools, wherein an inner or pilot spool operates through and within a concentrically mounted outer or master spool wherein the pilot spool is adapted to be operated by solenoid, manual, fluid pressure, or mechanical types of operating means. This valve design thus allows a compact construction wherein the pilot valves are contained within the structure of the basic or master valve allowing a great reduction in size.

A further common shortcoming of pilot operated valves is the self-destructive effect of stopping spools or poppets moving at high speed. Accordingly, it is still another object of this invention to provide a means for absorbing or cushioning the forces developed in shifting the master spool at high speed thereby providing a valve capable of high speed operation, yet rugged and compact in construction, economical of manufacture, and fast, efficient and long lived in operation.

A still further shortcoming of existing valve designs is that they inherently possess inefficient flow characteristics because of non-uniformity of passages, abrupt changes in direction of flow and failure of the valve package to be designed around maximum flow conditions. Therefore, it is another object of this design to provide a highly efficient circular flow pattern with uniform passages, with no abrupt changes in direction and with utilization of the full package structure to give maximum flow areas within a given space, thus allowing a much more compact valve body with a given capacity.

It is a still further object of the invention to provide a four-way reversing valve wherein the outer or master spool is actuated by the inner spool coacting with two fixed positioned three-way valves operating within the core of the master spool.

Other objects, features and advantages of this invention will be apparent from the following detailed description and appended claims, reference being had to the accompanying drawing forming a part of the specification wherein like reference numerals designate corresponding parts of the several views.

In the drawings:

FIG. 1 is a horizontal top view of a dual-spool air valve employing a single solenoid and made in accordance with the principles of the invention;

FIG. 2 is a side elevational view of the structure illustrated in FIG. 1, taken in the direction of the arrow marked "2";

FIG. 3 is an end elevational view of the structure illustrated in FIG. 2, taken from the right side thereof as viewed in FIG. 2;

FIG. 4 is an enlarged elevational view of the structure illustrated in FIG. 1, with the upper half thereof being in section and taken along the line 4—4 thereof, and showing the master spool moved to a first position, to the left as viewed in FIG. 4;

FIG. 5 is a fragmentary central elevational view of the dual-spool valve shown in FIG. 4 and showing the master spool moved to a second position, to the right as viewed in FIGS. 4 and 5;

FIG. 6 is a partial, broken, horizontal sectional view of the structure illustrated in FIG. 2, taken along the line 6—6 thereof, and looking in the direction of the arrows;

FIG. 7 is an enlarged bottom plan view of the valve body structure illustrated in FIG. 2, taken along the line 7—7 thereof; looking in the direction of the arrows, and with the end caps and solenoid and return spring removed;

FIG. 8 is a top plan view of the base structure illustrated in FIG. 4, taken along the line 8—8 thereof, and looking in the direction of the arrows;

FIG. 9 is an elevational sectional view of the structure illustrated in FIG. 8, taken along the line 9—9 thereof, and looking in the direction of the arrows;

FIG. 10 is an end elevational view of the base structure illustrated in FIG. 8, taken along the line 10—10 thereof, and looking in the direction of the arrows;

FIG. 11 is an elevational sectional view of the structure illustrated in FIG. 6, taken along the line 11—11 thereof, and looking in the direction of the arrows;

FIG. 12 is an outer elevational view of an annular cushion member employed in the dual-spool valve of the invention;

FIG. 13 is a lower end view of the structure illustrated in FIG. 12, taken along the line 13—13 thereof, and looking in the direction of the arrows;

FIG. 14 is an enlarged elevational sectional view of the structure illustrated in FIG. 12, taken along the line 14—14 thereof, and looking in the direction of the arrows;

FIG. 15 is an elevational view of the retaining ring member employed in the dual-spool valve of the invention;

FIG. 16 is a side view of the structure illustrated in FIG. 15, taken along the line 16—16 thereof, and looking in the direction of the arrows; and, FIG. 17 is a partial central elevational sectional view of a modified dual-spool valve made in accordance with the invention and showing the return spring replaced with a second solenoid.

The valve of the present invention may be provided with one solenoid and a spring return means for actuating the pilot or inner spool or it may be provided with two solenoids for actuating the pilot spool. FIGS. 1 through 16 illustrate the preferred embodiment of the valve of the present invention and show a spring return valve. FIG. 17 illustrates the preferred embodiment provided with two solenoids for moving the pilot spool. The valve of the present invention is especially adapted for controlling the flow of air under pressure but it will be obvious that the valve may be used to control other pressure fluids such as a liquid or gas under pressure. The valve of the present invention is adapted to feed and exhaust pressure fluid alternately and successively from opposite end of a cylinder which is to be controlled by the valve.

Referring now to the drawings, and in particular to

FIGS. 1, 2 and 3, a valve embodying the invention is shown and comprises the valve body or casing, generally indicated by the numeral 10, which is adapted to be secured on the base, generally indicated by the numeral 11, by means of a plurality of round head screws 12. As shown in FIGS 4 and 6, the valve body 10 is provided with a plurality of annular chambers 13, 14, 15, 16 and 17. As best seen in FIGS. 6 and 11, the annular chamber 15 which comprises the main pressure fluid supply chamber is provided on the lower end thereof at one side thereof with an inlet port 19. The chamber 15 is enlarged longitudinally along one side thereof as indicated by the numeral 18. The inlet port 19 communicates with the passage 20 formed in the base 11 and this passage 20 is provided with a fluid inlet port 21 which is adapted to be connected to a suitable source of high pressure fluid, such as air. The chamber 14 may be termed a first pressure fluid feed or transfer chamber and, as shown in FIGS. 4 and 6, is provided on one side thereof at the lower end thereof with a port 22 which communicates with the passage 23 on the base 11. The passage 23 is provided with the port 24 which is adapted to be connected to one end of a cylinder or fluid motor which is to be controlled by the valve. The base 11 is provided with a second port 25 which is adapted to be connected to the other end of the cylinder or the fluid motor which is to be controlled by the valve and this port communicates with the passage 26 in the base 11. As best seen in FIGS. 6 and 7, the passage 26 in the base 11 communicates with the port 27 on the lower side of the second transfer chamber 16 to communicate this chamber with the other end of the cylinder to be controlled.

As shown in FIGS. 6, 7, and 8, the chamber 13, which may be termed an exhaust chamber, is provided on the lower end thereof at a central position with an exit port port 28 which communicates with the longitudinal passage 29 in the base 11. The passage 29 communicates through the opening 30 in the base wall 31 with the passage 32. The passage 32 is exhausted means of the exhaust port 33 in the base 11. The second exhaust chamber 17 is provided on the lower side thereof with a substantially centrally disposed exit port 34 which communicates with the exit passage 32 in the base by means of the passage 29 and opening 30. The base 11 is provided with suitable bolt holes as 35 for the reception of mounting bolts.

As shown in FIGS. 4, 5 and 6, the valve body 10 is provided with the reduced circular end portions 36 and 37 having the inwardly extended hubs 38 and 39, respectively, and these end portions are provided with axial bores therethrough. The axial bores through the valve body end portions 36 and 37 are reduced in size at the inner end thereof in the hubs 38 and 39, as indicated by the numerals 40 and 41. As best seen in FIGS. 4, 5 and 6, the chamber walls 42, 43, 44 and 45 are provided with axial bores therethrough as 46, 47, and 49, respectively, so as to form passageways between the respective adjacent annular chambers 13, 14, 15, 16 and 17.

As shown in FIGS. 4, 5 and 6, the valve includes a master or outer spool, generally indicated by the numeral 50, which is adapted to be slidably mounted in the axially aligned bores 40, 41, 46, 47, 48 and 49 in the valve body 10. The ends of the master spool 50 are provided with enlarged diameter or annular ring end portions 51 and 52 which are slidably mounted in the hub bores 40 and 41, respectively, and which function as fluid piston heads for spool shifting purposes as more fully described hereinafter. The annular rings 51 and 52 are each provided with a peripheral groove in which is operatively seated an O-ring packing or sealing member as 53 and 54. The main spool 50 is provided with the longitudinally spaced apart annular rings 55 and 56 each of which is provided with a groove on the inner face thereof as 57 and 58. Operatively mounted in the grooves 57 and 58 are the annular sealing rings 59 and 60, respectively, which are adapted to sealingly engage the bores 46, 47, 48 and 49 as more fully described hereinafter. The annular rings 55 and 56 are spaced apart longitudinally and coact with the annular ring end portions 51 and 52 to form the grooves or annular passageways 61, 62 and 63 which are adapted to communicate adjacent chambers in the valve body as more fully described hereinafter. The annular rings 55 and 56, and the sealing rings 59 and 60, respectively, form a pair of spaced apart valve members which are centrally located on the master spool of sleeve 50.

As shown in FIGS. 4, 5 and 6, each end of the valve is provided with similar structure and, accordingly, the structure on the right end, as shown in these views, will be described with certain reference numerals and the similar structure on the left end will be marked with corresponding reference numerals followed by the small letter "a." The bore through the ends of the valve body 10 is enlarged at the outer ends of the bores 40 and 41, as indicated by the numeral 64, to provide a step in which is seated an annular inner retainer bushing 65 which functions as a cylinder head. Integrally formed on the inner side of the retainer 65 is the hollow guide member or sleeve 66 which is adapted to slidably extend into the end of the axial bore 67 of the main spool 50. Air under pressure is adapted to be admitted into the annular space between the end of the master spool 50 and the retainer 65 by the following means. The master spool 50 is provided with a plurality of radial holes 68 which communicate with the groove 62 which in turn communicates with the main pressure fluid supply chamber 15. Pressure fluid is thus admitted at all times into the bore 67 inside of the main spool 50 and is allowed to pass through the bore 69 in the sleeve 66 and through radial ports of passageways 70 formed through the retainer sleeve 66. The ports 70 convey the fluid into the space behind the ends of the master spool 50 for moving the master spool as more fully described hereinafter. The end faces of the master spool are provided with a small counterbore as 71.

As shown in FIGS. 4, 5 and 6, the valve is provided with a pilot or innerspool, generally indicated by the numeral 72, which is mounted within the bore 67 of the master spool 50. The pilot spool 72 is provided with a groove 73 at each end thereof in each of which is a moulded seal as 74 which is adapted to sealingly engage the bore 69 in the retainer sleeve 66 so as to regulate the flow of presure fluid through the port 70 depending on the relative position of the pilot valve. The bore 69 in the retainer sleeve 66 is continued outwardly into the retainer 65 as indicated by the numeral 75 and is communicated by means of the reduced bore 76 with the space 77 between the outer annular retainer 78 and the inner retainer 65. The bore portions 41, 64, 79 and 82 form an annular end chamber at one end of the valve body and the bore portions 40, 64a, 79a and 82a form an annular end chamber at the other end of the valve body. The annular sealing cushion 81 maintains the retainers 65 and 78 in spaced apart positions to divide the annular end chamber into the outer annular chamber portion or space 77 and the inner annular chamber between the enlarged sleeve end 52 and the retainer 65. The bore in the end portions is enlarged at 79 and the inner retanier is provided with a reduced outer portion 80 and mounted in the space formed by this structure is an annular sealing cushion, generally indicated by the numeral 81, and shown in enlarged form in FIGS. 12, 13 and 14. The outer retainer 78 is disposed in the enlarged bore portion 82 and is retained in position by means of the retaining clip 83. It will be seen that the inner retainer 65 and the cushion 81 are in turn held in place by means of the outer retainer 78. The outer retainer 78 is provided with an outwardly extended hub and formed therethrough is the axial bore 84 in which is slightly journalled the reduced outer end of the pilot spool 72. As best seen in FIGS. 4, 6, 12, 13 and 14, the cushion 81 is provided with a metal ring 85 on the outer side thereof in which is formed the annular groove 86 which is exhausted out to the atmosphere by means of the holes 87. The groove 86 communicates with the space 77 between the retainers 65 and 78 by means of the slot 88. It will be seen that when the moulded seal 74 on the pilot valve is disposed inwardly of the ports 70, the space behind the ends of the master spool will be exhausted to the atmosphere through the ports 70, the bores 75 and 76 the space 77, the slots 88 and 86 and the holes 87. As shown in FIGS. 4, 5 and 6, each end of the master spool 50 is provided with an O-ring 89 for sealing purposes between the bore 67 and the retainer sleeve 66.

As shown in FIGS 4 and 6, the pilot spool 72 is adapted to be normally biased to the right by means of the return spring 90 which has one end abutting a shoulder on the retainer ring 91 which is seated on the reduced left end 92 of the pilot spool and against a shoulder thereon. The other end of the spring 90 is seated within the integrally formed ring 93 on the inner end face of the spring cover 94. The spring cover 94 is provided with a reduced annular lip as 95 which is adapted to be seated on the reduced shoulder 96 formed on the left end of the valve body 10. A suitable O-ring 97 is mounted between the cover 94 and the shoulder 96. The cover 94 is releasably secured on the body shoulder 96 by means of the retaining ring 98 which is adapted to be partially mounted within the groove 99 formed in the shoulder 96 and in the groove 100 formed on the inner surface of the cover lip 95. As best seen in FIGS 2, 15 and 16, the retaining ring 98 is provided with the finger engageing arms 101 and 102. In order to release the retaining ring 98 from the groove 100, the safety lock 103 is moved to the left as viewed in FIG. 16 to permit the arms 101 and 102 to be squeezed together. This releases the cover 105 which may then be removed.

As best seen in FIG. 4, the right end of the valve body is enclosed by the end cover 105 which is provided with the inner peripheral lip 106 adapted to seat on the reduced shoulder 107 in the same manner as the end cover 94. A sealing ring 108 is provided between the end cover 105 and the valve body 10. A retaining clip 109 similar in structure and function to the retaining clip 98 is provided to retain the end cover 105 on the body 10. The retaining ring 109 is adapted to be seated in the grooves 110 and 111 in the valve body 10 and cover lip 106, respectively.

The pilot valve 72 is adapted to be moved to the left as viewed in FIG. 4 by means of a conventional solenoid, generally indicated by the numeral 112. As disposed, the solenoid 112 is adapted to function as a push type solenoid to push the pilot valve to the left as viewed in FIG. 4, when the solenoid is energized. The solenoid 112 includes the usual armature rod 113 which is adapted to abut the right end of the reduced end 114 of the pilot valve 72. The outer end of the armature rod 113 is provided with the integral enlarged stop member 115 which is adapted to abut the rubber stop pad 116 when the solenoid is de-energized. The stop pad 116 is fixedly secured in the outer end of the cover 105 by any suitable means. The solenoid 112 is held in the insert member 117 by means of the rubber solenoid mounting members 118. The lead wires 119 and 120 of the solenoid coil are adapted to pass downwardly through the passageways 121 and 122, respectively, as shown in FIGS. 4 and 6. The passageways 121 and 122 communicate with the chamber 123 on the lower face of the valve body which in turn communicates with the chamber 124 in the base. The lead wires 119 and 120 may thus pass down into the base chamber 124 and out through the opening 125 which is tapped for the reception of suitable electrical conduit means. As shown in FIG. 4, the left end of the valve is provided with similar means for the passage of conductor wires out of the valve when the return spring 90 is replaced by a second solenoid as shown in FIG. 17, and as more fully described hereinafter. As shown in FIG. 4, the conductor chambers 124 are connected by the longitudinally extended passageway 126. The conductor passageways and chambers on the left end of the valve are numbered with similar reference numerals followed by the small letter "a."

In operation, the main spool 50 and the pilot spool 72 would be in initial positions as shown in FIG. 4. That is, before the solenoid 112 is energized the main spool 50 would be disposed in the left position with the pilot valve being disposed in the right position and held in this position by means of the spring 90. Fluid under pressure would pass from the supply chamber 15 and through the port 68, the bore 67, the bore 69 and the ports 70 and into the space behind the right end of the main spool 50 to urge it to the left position.

In the position shown in FIG. 4, it will be seen that the inlet port 21 would be connected to the main supply chamber 15 and that the chamber 15 would be connected by means of the spool groove 62 with the first transfer or feed chamber 14 so as to feed fluid under pressure out through the port 24 to one end of a cylinder or fluid motor to be supplied with pressure fluid. The other end of the cylinder being supplied with fluid would be exhausted through the port 25 and into the second transfer chamber 16. The chamber 16 is in communication with the exhaust chamber 17 by means of the spool groove 63 and the chamber 17 is in communication with the exhaust port 33.

When the solenoid 112 is energized, the armature 113 will be moved to the left as viewed in FIG. 4 whereby the pilot valve 72 will also be moved to the left against the pressure of spring 90. The pilot spool 72 will be thus moved to the position shown in FIG. 5 and air under pressure will be admitted to the left end of the main spool so as to move it to the right position shown in FIG. 5. The right end of the main spool will be exhausted to the atmosphere through the holes 87 in the valve body as described hereinbefore. When the valves are in the position shown in FIG. 5, fluid under pressure will flow from the main supply chamber 15 through the spool groove 62 and into the chamber 16. The pressure fluid will then flow out through the port 25 and to the second end of the cylinder being controlled. The first end of the cylinder being controlled will then be exhausted through the port 25 into the chamber 13. The chamber 13 is then exhausted through the passageways 29, 30 and 32 and out through the exhaust port 33 to the atmosphere. It will be seen, that the valve of the present invention is constructed so that the pressure fluid passing through the valve will flow therethrough in a circular path since the ports 21, 24, 25 and 33 are disposed below the chambers 13, 14, 15, 16 and 17 and the ports leading into each of the chambers are on the lower side of the valve body 10 and are laterally spaced apart.

FIGS. 1, 2 and 3, show a conventional manual solenoid operator 127 mounted on the cover 105 to permit manual operation of the solenoid 112, if desired. As shown in FIGS. 2 and 3, the solenoid cover 105 is provided with a safety chain 128 having one end thereof secured to the cover 105 by means of the screw 129 and the other end thereof secured to the valve body 10 by means of the screw 130. The spring cover 94 may also be provided with a similar safety chain, if desired.

FIG. 17 illustrates a slightly modified valve in which the spring 90 has been replaced with a second solenoid generally indicated by the numeral 112a. The solenoid 112a is constructed the same as the first solenoid 112 and the corresponding parts have been marked with similar reference numerals followed by the small letter "a." The operation of the valve of FIG. 17 would be the same as the embodiment having the return spring 90 with the second solenoid 112a carrying out the function of the spring 90.

The first illustrated valve with the return spring 90 may readily and easily be converted to a double-solenoid valve as shown in FIG. 17 by merely replacing the spring 90 and seat 91 and its associated cover with a second solenoid 112a and its associated cover.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims. For example, in the double-solenoid embodiment the longitudinal passageway 126 in the base 11 may be used for conveying the lead wires 119 and 120, and 119a and 120a, to one end of the base 11 and out through either the opening 125 or the opening 125a.

It will be seen, that the inner or pilot spool 72 and the retainers 65a and 65 are constructed and arranged to provide a three-way valve at each end of the compound valve for admitting and exhausting pressure fluid to and from the spaces in the bores 40 and 41 between the ends of the outer spool 50 and the retainers 65a and 65. The three-way valve at each end of the pilot spool 72 is formed by the co-action of the bores 69, 75 and 76, and, the ports 70 in the retainer structure, and, the seal 74 carried on the pilot spool 72. It will be seen, that when the pilot spool 72 is in the right position, as shown in FIG. 4, the seal 74 blocks the bore 75 but permits flow of pressure fluid through the bore 69 and ports 70 into the space in bore 41 of boss 39. When the pilot spool 72 is in the left position, as shown in FIG. 5, the seal 74 blocks the bore 69 but permits the space in bore 41 to be exhausted through the ports 70 and bores 75 and 76.

What I claim is:

1. A valve construction of the class described comprising: a body; a main supply chamber in said body; a port for admitting fluid under pressure to said supply chamber; a pair of transfer chambers in said body; a pair of exhaust chambers in said body; an outlet port in said body for connecting said exhaust chambers to the exterior of the body; a master valve slidably mounted in said body for connecting said supply chamber to a first one of said pair of transfer chambers and the other transfer chamber to a first one of said pair of exhaust chambers when moved to a first position, and for connecting the supply chamber to the other of said pair of transfer chambers and the other of said pair of exhaust chambers to the first transfer chamber when moved to a second position; said master valve being movable between said first and second positions in response to fluid under pressure acting on the ends thereof; passageways in said body for conducting and exhausting fluid under pressure to and from the ends of said master valve; a pair of three-way valves for controlling the flow of fluid under pressure in said passageways to alternately admit the fluid under pressure to one end of the master valve and simultaneously exhaust fluid from the other end of the master valve; and, means for operating said pair of three-way valves.

2. The structure as defined in claim 1, wherein: said pair of three-way valves include a pair of seal members carried at spaced apart points on an elongated movable member, and, said means for operating said pair of three-way valves including means engageable with the ends of said elongated member for moving it between two positions for alternate operation of said pair of three-way valves.

3. The structure as defined in claim 1, wherein: said body includes a retainer means in each end thereof for retaining said master valve in said body; said retainer means including an inner member and an outer member; and, an annular cushion member positioned between said retainer members.

4. A valve construction of the class described comprising a body; a main supply chamber in said body; a port for admitting fluid under pressure to said supply chamber; a pair of transfer chambers in said body; a pair of exhaust chambers in said body; an outlet port in said body for connecting said exhaust chambers to the exterior of the body; a master valve slidably mounted in said body for connecting said supply chamber to a first one of said pair of transfer chambers and the other transfer chamber to a first one of said pair of exhaust chambers when moved to a first position, and for connecting the supply chamber to the other of said pair of transfer chambers and the other of said pair of exhaust chambers to the first transfer chamber when moved to a second position; said master valve being movable between said first and second positions in response to fluid under pressure acting on the ends thereof; passageways in said body for conducting and exhausting fluid under pressure to and from the ends of said master valve; a pair of three-way valves mounted on an elongated member for controlling the flow of fluid under pressure in said passageways to alternately admit the fluid under pressure to one end of the master valve and simultaneously exhaust fluid from the other end of the master valve; means for operating said pair of three-way valves including means engageable with the ends of said elongated member; said body including a retainer means in each end thereof for retaining said master valve in said body; said retainer means including an inner member and an outer member; an annular cushion member positioned between said retainer members; and, said annular cushion members each being provided with an annular groove to connect the exhausting passageways to the exterior of the body.

5. The structure as defined in claim 4, wherein: said means engageable with the ends of said elongated member for moving it comprises a solenoid at one end thereof and a return spring at the other end thereof.

6. The structure as defined in claim 4, wherein: said means engageable with the ends of said elongated member for moving it comprises a solenoid at each end thereof.

7. The structure as defined in claim 4, wherein: the ends of said body are enclosed by covers slidably mounted thereon, and a retaining clip ring is carried in each of said covers for releasably securing the covers in place on the body.

8. The structure as defined in claim 4, wherein: said annular cushion member includes a first portion made from a resilient material and a second metallic portion mounted on a shoulder on said first portion and having said annular groove formed therein.

9. A valve construction of the class described comprising: a body; a main supply chamber centrally located in said body; a port for admitting fluid under pressure to said supply chamber; a pair of transfer chambers located adjacent to and in communication with said supply chamber in said body; a pair of ports for transmitting fluid to or from said transfer chambers; a pair of exhaust chambers located adjacent to and in communication with said transfer chambers in said body; a first pair of exhaust ports to exhaust fluid from said exhaust chambers to the exterior of the body; an annular chamber in each end of said body; a second pair of exhaust ports to exhaust fluid from said annular chambers to the exterior of the body; a sleeve with enlarged ends and a pair of spaced apart valves centrally located thereon slidably mounted in said body for connecting said main supply chamber to a first one of said transfer chambers and the other transfer chamber to a first one of said pair of exhaust chambers when moved to a first position, and for connecting said main supply chamber to the other of said transfer chambers and the other of said exhaust chambers to the second transfer chamber when moved to a second position; a port in said sleeve intermediate of said pair of valves maintaining constant communication of the interior thereof with said main supply chamber; a pair of retainers positioned in each of said annular end chambers with one of said retainers having a hollow portion thereon slidably engaging the interior surface of one end of said sleeve; each of said hollow portions having radial ports therethrough arranged to provide communication thereof with the adjacent annular end chamber; a stem with spaced apart pilot valves formed thereon; said stem slidably extending through said sleeve, said retainers, and said annular end chambers; external means for actuating said stem to cause said pilot valves to cooperate with the radial ports in each of said retainer hollow portions to admit and exhaust the fluid under pressure alternately to and from each annular chamber; an annular cushion member supporting each of said pair of retainers and maintaining each pair of retainers in spaced apart positions to divide the annular end chambers into an inner and outer portion and to seal the retainers and absorb the shock of said stem and sleeve when they are actuated; an external groove in each of said annular cushion members in register with said second pair of exhaust ports in said body; a radial slot in the flange of each of said cushion members to provide a passage to exhaust fluid from the outer portion of each of said divided annular end chambers; and, each of said pair of retainers including a removable circular closure member with locking means to secure said annular cushion members in place.

10. A valve construction of the class described comprising: a body; a main supply chamber centrally located in said body; a port for admitting fluid under pressure to said supply chamber; a pair of transfer chambers located adjacent to and in communication with said supply chamber in said body; a pair of ports for transmitting fluid to or from said transfer chambers; a pair of exhaust chambers located adjacent to and in communication with said transfer chambers in said body; a first pair of exhaust ports to exhaust fluid from said exhaust chambers to the exterior of the body; an annular chamber in each end of said body; a second pair of exhaust ports to exhaust fluid from said annular chambers to the exterior of the body; a sleeve with enlarged ends and a pair of spaced apart valves centrally located thereon slidably mounted in said body for connecting said main supply chamber to a first one of said transfer chambers and the other transfer chamber to a first one of said pair of exhaust chambers when moved to a first position, and for connecting said main supply chamber to the other of said transfer chambers and the other of said exhaust chambers to the second transfer chamber when moved to a second position; a port in said sleeve intermediate of said pair of valves maintaining constant communication of the interior thereof with said main supply chamber; the enlarged sleeve ends being each slidably mounted in the inner end of the respective adjacent annular end chamber so as to slidably engage the interior surface thereof; a pair of retainers positioned in each of said annular end chambers with one of said retainers having a hollow portion thereon slidably engaging the interior surface of one end of said sleeve; each of said hollow portions having radial ports therethrough arranged to provide communication thereof with the adjacent annular end chamber; a stem with spaced apart pilot valves formed thereon; said stem slidably extending through said sleeve, said retainers, and said annular end chambers; external means for actuating said stem to cause said pilot valves to cooperate with the radial ports in each of said retainer hollow portions to admit and exhaust the fluid under pressure alternately to and from each annular chamber to permit the fluid under pressure to act on the enlarged sleeve ends to move the sleeve between said first and second positions; an annular cushion member supporting each of said pair of retainers and maintaining each pair of retainers in spaced apart positions to divide the annular end chambers into an inner and outer portion and to seal the retainers and absorb the shock of said stem and sleeve when they are actuated; each of said pair of retainers including a closure member with locking means to secure the same in place in the body; and, passageways in each of said pair of retainers connected at one end thereof to one of said second pair of exhaust ports in said body and connectible at the other end thereof by means of one of the pilot valves to the adjacent annular end chamber to exhaust the same fluid under pressure.

11. A valve construction of the class described comprising: a body; a main supply chamber centrally located in said body; a port for admitting fluid under pressure to said supply chamber; a pair of transfer chambers located adjacent to and in communication with said supply chamber in said body; a pair of ports for transmitting fluid to or from said transfer chambers; a pair of exhaust chambers located adjacent to and in communication with said transfer chambers in said body; a first pair of exhaust ports to exhaust fluid from said exhaust chambers to the exterior of the body; an annular chamber in each end of said body; a second pair of exhaust ports to exhaust fluid from said annular chambers to the exterior of the body; a sleeve with enlarged ends and a pair of spaced apart valves centrally located thereon slidably mounted in said body for connecting said main supply chamber to a first one of said transfer chambers and the other transfer chamber to a first one of said pair of exhaust chambers when moved to a first position, and for connecting said main supply chamber to the other of said transfer chambers and the other of said exhaust chambers to the second transfer chamber when moved to a second position; a port in said sleeve intermediate of said pair of valves maintaining constant communication of the interior thereof with said main supply chamber; the enlarged sleeve ends being each slidably mounted in the inner end of the respective adjacent annular end chamber so as to slidably engage the interior surface thereof; a pair of retainers positioned in each of said annular end chambers with one of said retainers having a hollow portion thereon slidably engaging the interior surface of one end of said sleeve; each of said hollow portions having radial ports therethrough arranged to provide communication thereof with the adjacent annular end chamber; a stem with spaced apart pilot valves formed thereon; said stem slidably extending through said sleeve, said retainers, and said annular end chambers; external means for actuating said stem to cause said pilot valves to cooperate with the radial ports in each of said retainer hollow portions to admit and exhaust the fluid under pressure alternately to and from each annular chamber to permit the fluid under pressure to act on the enlarged sleeve ends to move the sleeve between said first and second positions; an annular cushion member supporting each of said pair of retainers and maintaining each pair of retainers in spaced apart positions to divide the annular end chambers into an inner and outer portion and to seal the retainers and absorb the shock of said stem and sleeve when they are actuated; each of said pair of retainers including a closure member with locking means to secure the same in place in the body; a passageway in each of said pair of retainers connecting the interior of each of said retainer hollow portions with the outer portions of the annular end chambers; and, passageways in said body connecting the outer portions of the annular end chambers with said second pair of exhaust ports in said body.

12. A valve construction of the class described comprising: a body; a main supply chamber in said body; a port for admitting fluid under pressure to said supply chamber; a pair of transfer chambers in said body; a pair of exhaust chambers in said body; an outlet port in said body for connecting said exhaust chambers to the exterior of the body; a master valve slidably mounted in said body for connecting said supply chamber to a first one of said pair of transfer chambers and the other transfer chamber to a first one of said pair of exhaust chambers when moved to a first position, and for connecting the supply chamber to the other of said pair of transfer chambers and the other of said pair of exhaust chambers to the first transfer chamber when moved to a second position; said master valve being movable between said first and second positions in response to fluid under pressure acting on the ends thereof; passageways in said body for conducting and exhausting fluid under pressure to and from the ends of said master valve; a pair of three way valves mounted on an elongated member for controlling the flow of fluid under pressure in said passageways to alternately admit the fluid under pressure to one end of the master valve and simultaneously exhaust fluid from the other end of the master valve; means for operating said pair of three-way valves including means engageable with the ends of said elongated member; said body including a retainer means in each end thereof for retaining said master valve in said body; said retainer means including an inner member and an outer member; an annular cushion member positioned between said retainer members; said annular cushion members each being provided with an annular groove to connect the exhausting passageways to the exterior of the body; the ends of said body being enclosed by covers slidably mounted thereon; a retaining clip ring being carried in each of said covers for releasably securing the covers in place on the body; and, said annular cushion member including a first portion made from a resilient material and a second metallic portion mounted on a shoulder on said first portion and having said annular groove formed therein.

13. A valve construction of the class described comprising: a base having fluid pressure inlet passages and fluid pressure outlet passages; a body detachably mounted on said base; a main supply chamber in said body; a port in the lower end of said body communicating with the fluid pressure inlet passages in said base for admitting fluid under pressure to said supply chamber; a pair of transfer chambers in said body; a pair of exhaust chambers in said body; an outlet port in the lower end of said body communicating with the fluid pressure outlet passages in the base for connecting said exhaust chambers to the exterior of the base; a master valve slidably mounted in said body for connecting said supply chamber to a first one of said pair of transfer chambers and the other transfer chamber to a first one of said pair of exhaust chambers when moved to a first position, and for connecting the supply chamber to the other of said pair of transfer chambers and the other of said pair of exhaust chambers to the first transfer chamber when moved to a second position; said master valve being movable between said first and second positions in response to fluid under pressure acting on the ends thereof; passageways in said body for conducting and exhausting fluid under pressure to and from the ends of said master valve; a pair of three-way valves mounted on an elongated member for controlling the flow of fluid under pressure in said passageways to alternately admit the fluid under pressure to one end of the master valve and simultaneously exhaust fluid from the other end of the master valve; means for operating said pair of three-way valves including means engageable with the ends of said elongated member; said body including a retainer means in each end thereof for retaining said master valve in said body; said retainer means including an inner member and an outer member; an annular cushion member positioned between said retainer members; and, said annular cushion members each being provided with an annular groove to connect the exhausting passageways to the exterior of the body.

14. A valve construction of the class described comprising: a base having fluid pressure inlet passages and fluid pressure outlet passages; a body detachably mounted on said base; a main supply chamber in said body; a port in the lower end of said body communicating with the fluid pressure inlet passages in said base for admitting fluid under pressure to said supply chamber; a pair of transfer chambers in said body; a pair of exhaust chambers in said body; an outlet port in the lower end of said body communicating with the fluid pressure outlet passages in the base for connecting said exhaust chambers to the exterior of the base; a master valve slidably mounted in said body for connecting said supply chamber to a first one of said pair of transfer chambers and the other transfer chamber to a first one of said pair of exhaust chambers when moved to a first position, and for connecting the supply chamber to the other of said pair of transfer chambers and the other of said pair of exhaust chambers to the first transfer chamber when moved to a second position; said master valve being movable between said first and second positions in response to fluid under pressure acting on the ends thereof; passageways in said body for conducting and exhausting fluid under pressure to and from the ends of said master valve; a pair of three-way valves mounted on an elongated member for controlling the flow of fluid under pressure in said passageways to alternately admit the fluid under pressure to one end of the master valve and simultaneously exhaust fluid from the other end of the master valve; and, means for operating said pair of three-way valves including means engageable with the ends of said elongated member.

15. A valve construction of the class described in claim 14 wherein: said body includes a retainer means in each end thereof for retaining said master valve in the body; and, an annular cushion member mounted in said body for cushioning said retainer means.

16. A valve construction of the class described in claim 14, wherein: said means for operating said pair of three-way valves, including means engageable with the ends of said elongating member comprises a solenoid having electrical lead wires which are disposed in passageways formed in said base and body so that the lead wires pass down into the base and out through an opening in said base whereby they may be connected to a suitable electrical source of power.

References Cited in the file of this patent

UNITED STATES PATENTS

| | | |
|---|---|---|
| 2,409,517 | Schmit | Oct. 15, 1946 |
| 2,600,348 | Walthers | June 10, 1952 |
| 2,641,279 | Baldwin | June 9, 1953 |
| 2,658,485 | Dreyer | Nov. 10, 1953 |
| 2,663,143 | Joy | Dec. 22, 1953 |
| 2,709,421 | Avery | May 31, 1955 |
| 2,718,903 | Noon | Sept. 27, 1955 |
| 2,771,907 | Joy | Nov. 27, 1956 |
| 2,955,617 | Collins | Oct. 11, 1960 |